Nov. 4, 1941.  S. E. WITT  2,261,427
DOUGHNUT FORMING MACHINE
Filed Aug. 1, 1940
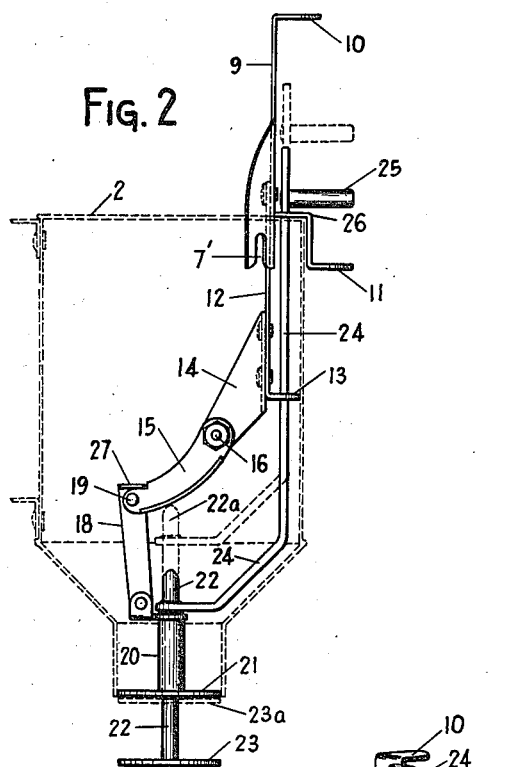
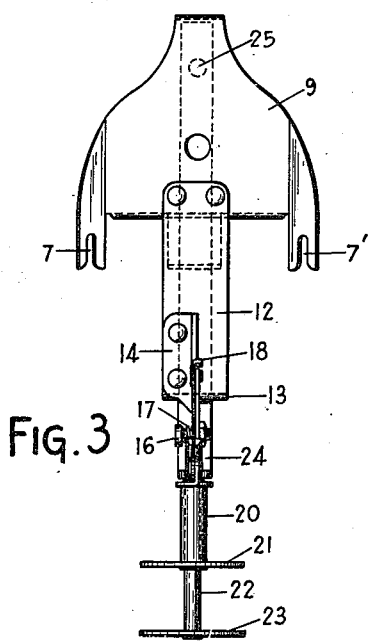
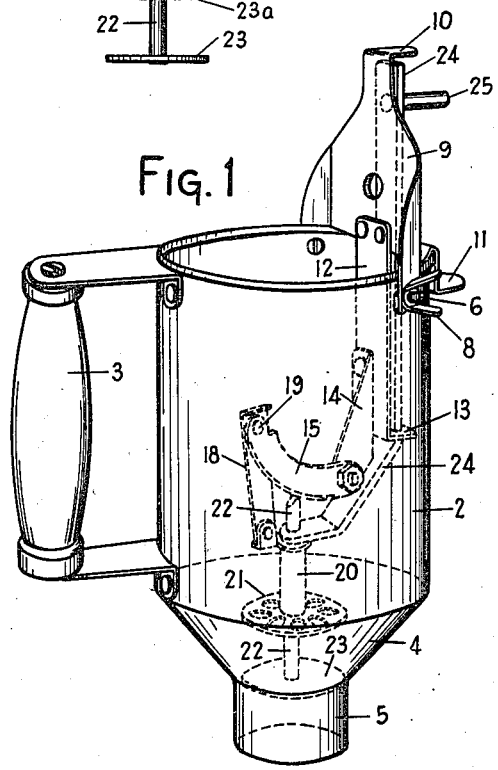
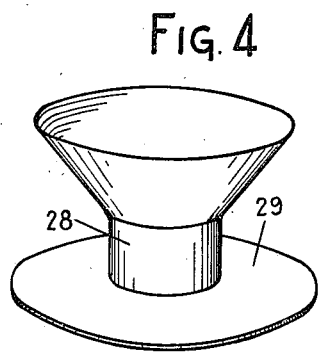
INVENTOR
*SAMUEL E. WITT*
BY
ATTORNEY Patented Nov. 4, 1941

2,261,427

UNITED STATES PATENT OFFICE 2,261,427

DOUGHNUT FORMING MACHINE

Samuel E. Witt, Geneva, Ill.

Application August 1, 1940, Serial No. 349,267

10 Claims. (Cl. 107—14)

My invention relates in general to an improved doughnut forming machine and more specifically to a device for use in homes, restaurants, or the like for forming doughnuts from the prepared dough mixture.

In the past the home making of doughnuts consisted in preparing the dough mixture, then rolling it out to a thick layer on a board or table, then cutting out the doughnut rings with a cutter and then picking them up and placing them in deep fat for frying. Recently a ready prepared doughnut flour has been placed on the market which only needs mixing with liquid and forming. This flour makes home baking of the doughnuts easier. The machine of my design further aids in making this process of forming the doughnuts from the dough a simpler matter. This machine comprises a container into which the prepared dough mixture is placed and a hand operated measuring and forming arrangement which, when operated, forces a certain amount of the dough down through an opening in the bottom of the container, and then, when further operated, forms the measured amount into a ring to form the doughnut and it is dropped off directly into the fat for frying without being touched by the hands.

Referring now to the accompanying sheet of drawings:

Fig. 1 is a perspective of the container with the measuring and forming device in normal position therein and shown in dotted lines.

Fig. 2 is a side view of the device in its operated position with the container shown in dotted lines to show its relation to the device and with the device shown in its intermediate operating position in dotted lines.

Fig. 3 is a view of the device taken from the left of Fig. 1 with the device in normal position as in Fig. 1.

Fig. 4 is a perspective view of a standard for supporting the device of the other figures when not in use.

In the above drawing 2 is the container which may be of glass, tin, aluminum or the like and having the handle 3 of any desired shape. As shown the lower end of the container is of an inverted cone shape 4, the truncated end of which terminates in a cylinder shaped lower end 5 having its ends open. The measuring and forming device forms a complete unit as shown in Figs. 2 and 3 and is detachably secured to the container in any desired manner. I have chosen to illustrate it as attached thereto by means of a pair of studs 6 secured to the container, over which the slots 7 and 7' in the unit are slipped and held by wing nuts, such as 8.

The forming unit comprises a main supporting plate 9 formed in the shape shown with the horizontally extending finger holds 10 and 11 at its upper and lower ends and the two wings bent at an angle to the main plate and having the slots 7 and 7' for attachment to the container. To the lower edge of the plate is riveted or otherwise secured the depending support 12 having its lower end bent out at right angles to form a bearing plate 13. At 14 I have shown another supporting L-shaped bracket riveted to the lower end of plate 13, and having mounted thereon, by a friction joint, the moving cam arm 15. The friction joint may be of any desired form and as shown comprises a bolt 16 with the usual nut as shown and a coil spring 17 under the head of the bolt and bearing against bracket 14 to clamp it against arm 15 to make a tight joint. The link 18 is secured to the end of cam arm 15 by a pivot pin 19. The link 18 is again pivotally secured at its lower end to a sleeve unit 20 carrying at its lower end the perforated disc 21 rigidly secured thereto. The sleeve member 20 is slidable on a rod 22 which carried a disc 23 rigidly secured at its lower end.

The rod 22 is rigidly secured in turn to the lower end of the slide member 24 which is slidable in bearing slots in the horizontally extending arms 11 and 13 of the main plate as shown in Fig. 2. The slide 24 carries a pin 25 extending outward therefrom and securely riveted thereto which is used as the operating element of the unit.

In the operation of the device its normal position is that shown in Fig. 1 with the slide 24 drawn up to its top position and the disc 23 closing the opening at the bottom of the container. Now when the container has been filled with the dough mixture the operator presses down the arm 24 by placing his thumb on rod 25 and his fingers under arm 11. As slide arm 24 moves down, all of the parts are moved to the position shown in full lines in Fig. 2 and rod 25 engages the upper surface of arm 11 at 26 in Fig. 2.

As slide 24 moves downward it slides in the slots in 11 and 13 and the lower end of slide 24 engages the sleeve 20 at its upper end as clearly seen in Fig. 1 and forces the unit 20 down with it while link 18 and 15 move about their pivots to the position shown in Fig. 2. The downward movement of rod 25 causes it to leave the cam surface 15 shortly after the beginning of its movement.

It will be seen that as discs 21 and 23 move downward a lump of dough is carried down through the cylindrical member 5 and is cut off from the contents of the container by disc 21 as it enters the cylinder. The dough thus cut off is now held suspended on disc 23 below the container.

At this time the link 18 and cam arm 15 are in the positions shown in Fig. 2, link 18 having been drawn down by sleeve 20 which was in turn pushed down by arm 24. The lower end of arm 15 has a cut out portion to accommodate the bent over end 27 of arm 18. This part 27 engages the end of the cut out to act as a stop. The operator now places his thumb on arm 10 and his fingers on rod 25 and starts to draw rod 25 and slide member 24 to its top position.

As the slide arm 24 moves upward the sleeve member 20 and disc 21 do not follow and rod 22 slides upward through sleeve 20 to bring the disc 23 into the position shown at 23a against the under side of disc 21. The friction bearing 16, 17 and the fact that arms 18 and 15 are in nearly a straight line prevents sleeve element 20 and disc 21 from following rod 22.

After this last described movement of rod 22 and disc 23 the dough which was measured out and hung suspended on disc 23 is now squeezed out between the two discs and dropped off to be fried in the deep fat.

As soon as rod 22 reaches the position described and as shown at 22a (Fig. 2) its upper end engages the cam surface of the under side of cam arm 15 and starts to raise that arm to its original position. The upper end of rod 22 rides along the cam surface 15 continually raising it as well as link 18 and sleeve member 20 and disc 21 until all parts have been restored to the position shown in Fig. 1 and ready for a second, similar operation. The operation may be continued as long as any dough remains in the container. The arm 24 as it is moved down first moves discs 21 and 23 down through cylinder 5 while maintaining them in spaced relation and carries a measured quantity of dough out of the container. The upward movement of arm 24 then brings the disc 23 into engagement with disc 21 to squeeze out the dough which was carried down and then rod 22 engages cam 15 and as it moves upward again restores discs 21 and 23 to their original spaced relation and at the same time raises them up into the body of the container to allow the next charge of dough to pass into the space between the two discs and ready for the next downward movement thereof.

It will be seen that the upper disc 21 has a number of large openings therethrough so that during this last movement when rod 22 acts on cam 15, the disc 21 will easily break away from disc 23 and also pass more easily through the dough mixture on its upward movement and allow the mixture to pass through the perforations to aid in filling in the space between the two discs for the next operation.

It will also be seen that one or more of the discs 21 or 23 are always within the cylinder 5 in the upward and downward movement so that a proper alignment is maintained for the operating mechanism.

In Fig. 4 the standard 28, as stated, is used to support the whole container when not in use and between operations thereof. It comprises merely a flat plate 29 as a base and the cone and cylinder parts rigidly secured thereto both slightly larger than parts 4 and 5 of the container so as to support the same when placed therein.

It will be seen from the above description that I have provided a very simple and efficient hand operated doughnut forming machine which is easily operated and has its parts so designed that cleaning thereof is a simple matter and the device is easily manufactured and assembled.

What is claimed is:

1. In a doughnut forming machine, a container carrying dough mixture, a forming and measuring device attached to the container, an operating slide therefor, said device including an upper and lower disc normally in spaced relation in the container, a single operation down and up of the slide first causing movement of said discs together in spaced relation to carry a charge of dough from one position to another, then a movement of the lower disc independent of the other to bring the discs together to form and discharge the doughnut, and then movement of both discs to restore them to their original spaced relation and to their original positions in the container.

2. A doughnut forming machine comprising a container, a cylinder forming a passage through the bottom of said container, a forming device in the container comprising a pair of discs of the same diameter as the inside of the cylinder, one disc normally closing the upper end of the cylinder, means for moving said discs through the cylinder to carry a charge of dough therethrough, for then bringing the lower disc into engagement with said upper disc while it is held stationary to form the dough into a doughnut shape, and for then moving said discs back through the cylinder to their original positions in the container.

3. In a doughnut forming machine, a container, a forming device attached to the container and including a rod member carrying a disc on the lower end thereof movable up and down into and out of the lower end of the container, a sleeve on said rod carrying a second disc, means for moving said rod to carry both discs a predetermined distance while maintaining them in spaced relationship, and for then moving the rod to move the first disc without moving the sleeve or second disc, a cam associated with said second disc, said cam engaged by said rod during part of its movement to move the sleeve and second disc at a greater speed than the movement of the first disc.

4. In a doughnut forming machine, a container, a device attached thereto for conveying measured quantities of dough from the container and forming them into doughnuts, said device comprising a pair of spaced elements, means for moving one of the elements to cause movement of both elements to carry a quantity of dough into position for forming, means for then returning the said one element to its original position, said other element retained in its moved position until the first element has returned a certain distance and until the elements have cooperated to form the dough into a doughnut and then moved by said first element into its original position.

5. In a doughnut forming machine, a dough container having a cylinder at its lower end, a rod movable up and down in the center of the container having a piston on its lower end moving up and down in the cylinder and out the lower end thereof, a disc above the piston in the cylinder, said disc supported on a sleeve mounted on said rod, movement of said rod downward carrying said disc with it, upward movement of said rod being first independent of any movement of said disc, and then causing upward movement of said disc to its normal position.

6. A machine as claimed in claim 5 in which there is a cam surface associated with said sleeve and engaged by said rod to cause said upward movement of said disc.

7. In a doughnut forming machine a dough container terminating in a discharge cylinder at its lower end, an upper and lower disc having movement up and down through said cylinder, means for moving both discs in spaced relation through the cylinder to carry a charge of dough therethrough, for then holding the upper disc stationary at the lower end of the cylinder and returning the lower disc upward to squeeze the dough out from between the discs, further upward movement of the lower disc causing the upper disc to return to its normal position at a greater speed than the lower disc, said upper disc perforated to permit passage of dough therethrough to assist in refilling the space between said discs as the discs return to normal and to facilitate passage thereof through said cylinder.

8. In a doughnut forming machine, a hopper terminating in a cylinder at its lower end, a device movably mounted on the container for carrying a charge of dough from the hopper through the cylinder and then forming it into a doughnut, said device comprising a reciprocating slide carrying a piston on its lower end normally closing the upper part of the cylinder, a sleeve on said slide carrying a plate above the piston, means for moving the slide downward carrying the plate in spaced relation thereto, a linking mechanism movable by said slide as the plate moves downward with the piston, said linking mechanism having a friction bearing which acts to hold the plate in its lowest position as the slide is moved upward, said slide engaging said linking mechanism to overcome the friction in said bearing and move said plate upward.

9. In a doughnut forming machine, a container having its lower end terminating in an open cylinder, a reciprocating rod in the center of said container with means for moving it up and down from a normal position and a piston on its lower end movable therewith through said cylinder, a sleeve slidable on said rod carrying a perforated plate above said disc, downward movement of said rod carrying said sleeve and plate with it to carry a charge of dough from the container through the cylinder, upward movement of the rod first causing said piston to draw closer to and meet said disc to squeeze out said charge in the form of a doughnut and then causing upward movement of both piston and disc at different rates to their normal positions.

10. In a doughnut forming machine, a container, a device for withdrawing a charge of dough from the container comprising a vertically sliding rod having a disc thereon and a sleeve mounted on the rod carrying a second disc, a friction jointed link normally holding said rod through the medium of said sleeve in its upper position, said rod when moved downward overcoming the friction in said joint to move both discs together to their lowest point, said rod when moved upward first moving said lower disc for a distance alone and then engaging said link to again overcome the friction in said joint to return both discs to their normal uppermost position.

SAMUEL E. WITT.